US008339212B2

(12) United States Patent
Wu et al.

(10) Patent No.: US 8,339,212 B2
(45) Date of Patent: Dec. 25, 2012

(54) FILTERING DEVICE AND DIFFERENTIAL SIGNAL TRANSMISSION CIRCUIT CAPABLE OF SUPPRESSING COMMON-MODE NOISES UPON TRANSMISSION OF A DIFFERENTIAL SIGNAL

(75) Inventors: Tzong-Lin Wu, Taipei (TW); Chung-Hao Tsai, Taipei (TW)

(73) Assignee: National Taiwan University, Taipei (TW)

( * ) Notice: Subject to any disclaimer, the term of this patent is extended or adjusted under 35 U.S.C. 154(b) by 495 days.

(21) Appl. No.: 12/701,287

(22) Filed: Feb. 5, 2010

(65) Prior Publication Data

US 2011/0032048 A1 Feb. 10, 2011

(30) Foreign Application Priority Data

Aug. 10, 2009 (TW) ................................ 98126758 A

(51) Int. Cl.
*H01P 3/08* (2006.01)
*H04B 3/32* (2006.01)

(52) U.S. Cl. ........................... 333/12; 333/204; 333/185

(58) Field of Classification Search .................... 333/12, 333/202, 204, 185
See application file for complete search history.

(56) References Cited

U.S. PATENT DOCUMENTS 6,700,483 B2 * 3/2004 Chernoguzov et al. ....... 340/506
2004/0000977 A1 * 1/2004 Killen et al. .................. 333/238

* cited by examiner

*Primary Examiner* — Robert Pascal
*Assistant Examiner* — Kimberly Glenn
(74) *Attorney, Agent, or Firm* — Occhiuti Rohlicek & Tsao LLP

(57) ABSTRACT

A filtering device is capable of suppressing common mode noises upon transmission of a differential signal, and includes a differential transmission line, a grounding layer, a dielectric unit and a conductive structure. The differential transmission line has a pair of conductive traces spaced apart from each other. The grounding layer is spaced apart from the differential transmission line. The dielectric unit is disposed between the differential transmission line and the grounding layer. The conductive structure is embedded in the dielectric unit, is coupled electrically to the conductive traces and the grounding layer, and cooperates with the differential transmission line, the grounding layer and the dielectric unit to form a stacked structure that has an effective negative permittivity, thereby suppressing the common mode noises coupled to the conductive traces. A differential signal transmission circuit is also disclosed.

19 Claims, 10 Drawing Sheets

FILTERING DEVICE AND DIFFERENTIAL SIGNAL TRANSMISSION CIRCUIT CAPABLE OF SUPPRESSING COMMON-MODE NOISES UPON TRANSMISSION OF A DIFFERENTIAL SIGNAL

CROSS-REFERENCE TO RELATED APPLICATION

This application claims priority of Taiwanese Application No. 098126758, filed on Aug. 10, 2009.

BACKGROUND OF THE INVENTION

1. Field of the Invention

This invention relates to a filtering device and a differential signal transmission circuit, more particularly to a filtering device and a differential signal transmission circuit capable of suppressing common-mode noises upon transmission of a differential signal.

2. Description of the Related Art

Differential signal transmission has been widely used in high-speed digital systems. However, a differential signal may accompany unwanted common-mode noises. For a high-speed data link, a cable is necessary to transmit the differential signal between two different electronic apparatuses. When the common-mode noises are coupled to the cable, the cable is excited to behave as an electromagnetic interference (EMI) antenna. Therefore, suppressing the common-mode noises upon transmission of the differential signal is necessary to solve the EMI problem associated with the cable.

Some conventional filtering devices capable of suppressing common-mode noises upon transmission of a differential signal employ patterned grounding structures, such as those disclosed in "An Embedded Common Mode Suppression Filter for GHz Differential Signals Using Periodic Defected Ground Plane," IEEE Microwave and Wireless Components Letters, vol. 18, no. 4, pp. 248-250, April 2008 and "A Novel Wideband Common-Mode Suppression Filter for GHz Differential Signals Using Coupled Patterned Ground Structure," IEEE Transactions on Microwave Theory and Technology, vol. 57, no. 4, pp. 848-855, April 2009. Although each of the aforesaid filtering devices has a relatively low cost, and is advantageous in terms of common-mode noises suppression over a wideband frequency range, it is disadvantageous in the following ways: a) it can not be miniaturized because one of the length and the width of the patterned grounding structure must be one half or one quarter of the wavelength of the differential signal, and b) its performance will be degraded with the inclusion of a shielding structure beneath the patterned ground structure.

SUMMARY OF THE INVENTION

Therefore, the object of the present invention is to provide a filtering device and a differential signal transmission circuit that can overcome the aforesaid drawbacks associated with the prior art.

According to one aspect of this invention, there is provided a filtering device capable of suppressing common-mode noises upon transmission of a differential signal. The filtering device comprises a differential transmission line, a grounding layer, a dielectric unit and a conductive structure. The differential transmission line has a pair of conductive traces spaced apart from each other. The grounding layer is spaced apart from the differential transmission line. The dielectric unit is disposed between the differential transmission line and the grounding layer. The conductive structure is embedded in the dielectric unit, is coupled electrically to the conductive traces and the grounding layer, and cooperates with the differential transmission line, the grounding layer and the dielectric unit to form a stacked structure that has an effective negative permittivity, thereby suppressing the common mode noises coupled to the conductive traces.

According to another aspect of this invention, there is provided a differential signal transmission circuit capable of suppressing common-mode noises upon transmission of a differential signal. The differential signal transmission circuit comprises:

an input terminal;

an output terminal;

a pair of mutually coupled first inductors, each of which has opposite first and second ends, and a node disposed between the first and second ends, the first ends of the first inductors serving as the input terminal, the second ends of the first inductors serving as the output terminal;

a mutual capacitor coupled between the nodes of the first inductors;

a series connection of two first capacitors coupled between the nodes of the first inductors; and a parallel connection of a second capacitor and a second inductor coupled between a common node between the second capacitors, and a reference node.

BRIEF DESCRIPTION OF THE DRAWING

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
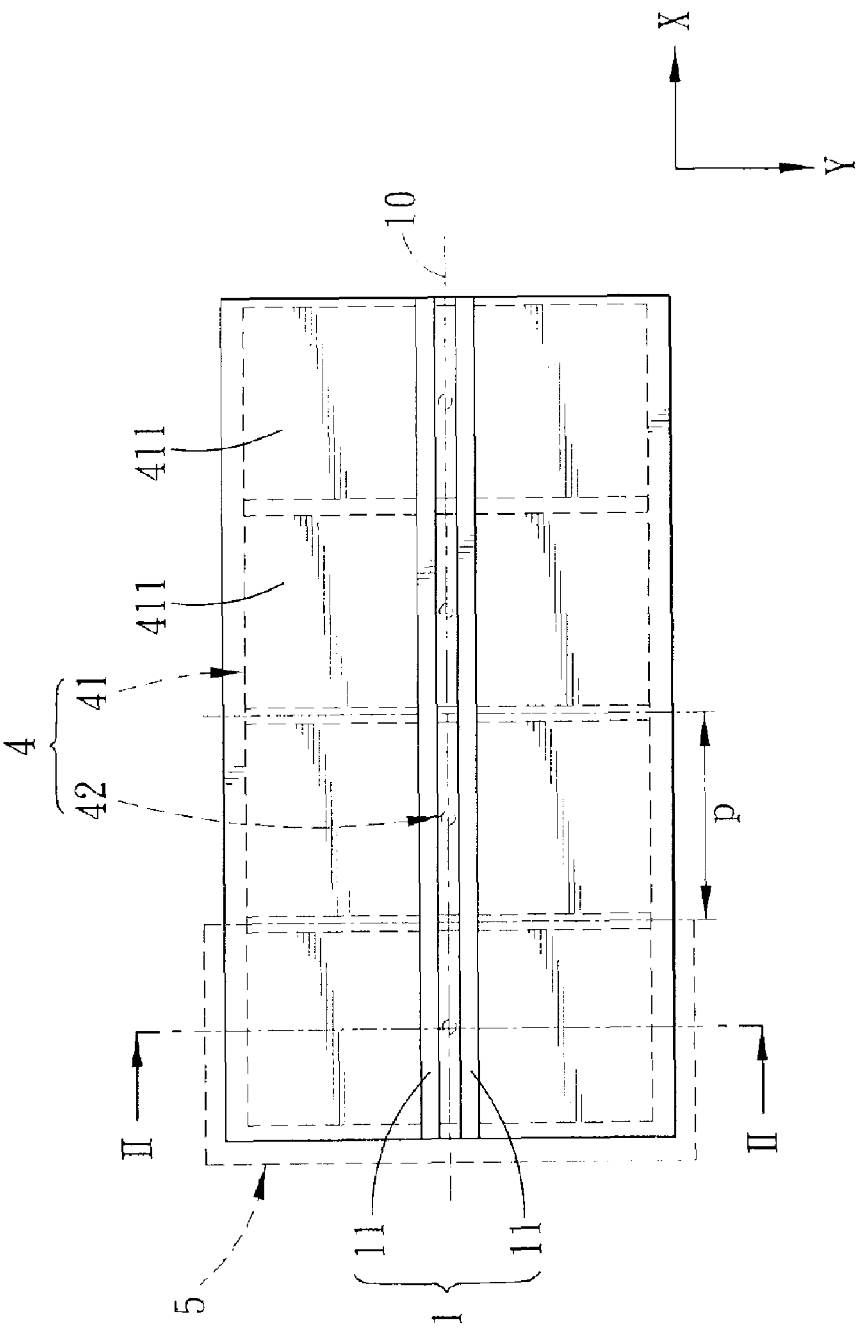
FIG. 1 is a schematic top view of the first preferred embodiment of a filtering device according to this invention.

Before the present invention is described in greater detail with reference to the accompanying preferred embodiments, it should be noted herein that like elements are denoted by the same reference numerals throughout the disclosure.

Figure 2:
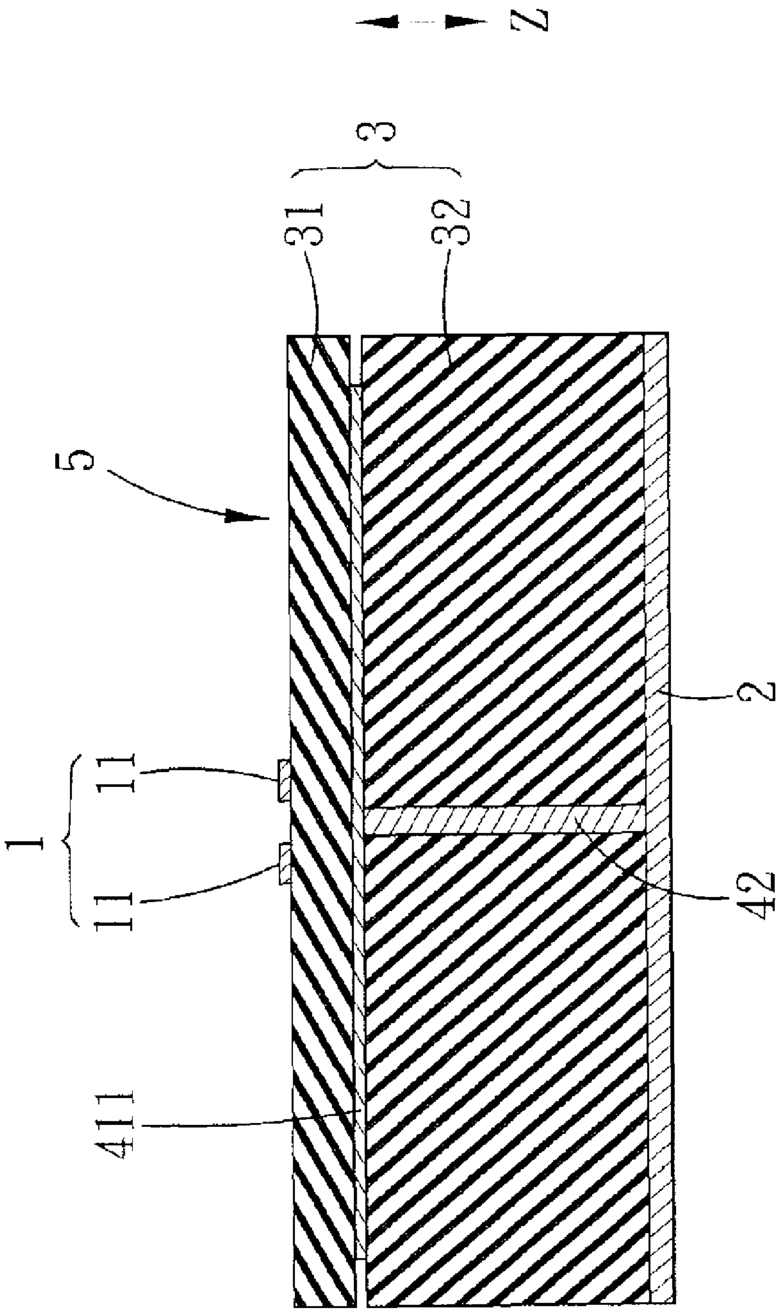
FIG. 2 is a schematic sectional view of FIG. 1 taken along line II-II.

Referring to FIGS. 1 and 2, the first preferred embodiment of a filtering device capable of suppressing common-mode noises upon transmission of a differential signal according to this invention is shown to include a differential transmission line 1, a grounding layer 2, a dielectric unit 3 and a conductive structure 4. In this embodiment, the filtering device can be implemented in a three-layer printed circuit board (PCB).

The differential transmission line 1 has a pair of conductive traces 11 spaced apart from each other and symmetrical with respect to a centerline 10 defined therebetween and extending in a first direction (X). In this embodiment, the conductive traces 11 extend in the first direction (X), and are opposite to each other in a second direction (Y) traverse to the first direction (X).

The grounding layer 2 is spaced apart from the differential transmission line 1 in a third direction (Z) that is transverse to the first and second directions (X, Y).

The dielectric unit 3 is disposed between the differential transmission line 1 and the grounding layer 2. In this embodiment, the dielectric unit 3 includes first and second substrates 31, 32 stacked in the third direction (Z). The first substrate 31 is disposed above the second substrate 32.

The conductive structure 4 is embedded in the dielectric unit 3, is coupled electrically to the conductive traces 11 and the grounding layer 2, and cooperates with the differential transmission line 1, the grounding layer 2 and the dielectric unit 3 to form a stacked structure. The conductive structure 4 includes a conductive layer 41 and a plurality of via units. The conductive layer 41 is sandwiched between the first and second substrates 31, 32, and is formed with a plurality of rectangular patterns 411 spaced apart from each other. The patterns 411 are coplanar and are periodically arranged along the first direction (X). Each pattern 411 extends in the second direction (Y), crosses the conductive traces 11 along the second direction (Y), and has two halves that are symmetrical with respect to the centerline 10. Each pattern 411 is coupled electrically to the conductive traces 11 through two coupling capacitances each formed between a corresponding one of the conductive traces 11 and a respective pattern 411. Preferably, the via units are aligned with the centerline 10. Each via unit interconnects electrically a corresponding one of the patterns 411 and the grounding layer 2. In this embodiment, each via unit includes a via 42 formed in the second substrate 32 such that opposite ends of the via 42 contact electrically and respectively the corresponding one of the patterns 411 and the grounding layer 2.

Each pattern 411 and the corresponding via unit (the via 42) cooperate with the differential transmission line 1, the grounding layer 2 and the dielectric unit 3 to constitute a unit cell 5. Thus, the filtering device shown in FIG. 1 has four unit cells 5.

Figure 3:
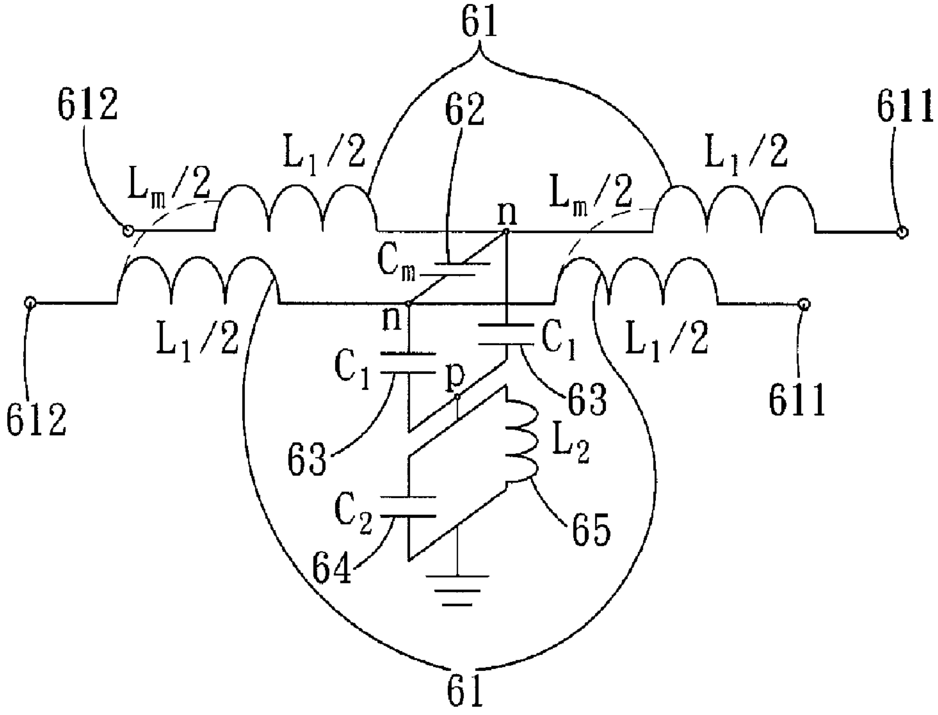
FIG. 3 is an equivalent lumped circuit of a unit cell of the first preferred embodiment.

FIG. 3 illustrates an equivalent lumped circuit of the unit cell 5 that serves as a differential signal transmission circuit. The differential signal transmission circuit includes an input terminal, an output terminal, a pair of mutually coupled first inductors 61, a mutual capacitor 62, a series connection of two first capacitors 63, and a parallel connection of a second capacitor 64 and a second inductor 65. Each first inductor 61 has opposite first and second ends 611, 612, and a node (n) disposed between the first and second ends 611, 612 such that a corresponding first inductor 61 is divided into two halves. The first ends 611 of the first inductors 61 serve as the input terminal, and the second ends 612 of the first inductors 61 serving as the output terminal. The mutual capacitor 62 is coupled between the nodes (n) of the first inductors 61. The series connection of the first capacitors 63 is coupled between the nodes (n) of the first inductors 61. The parallel connection of the second capacitor 64 and the second inductor 65 is coupled between a common node (p) between the second capacitors 63, and a reference node, such as ground.

For each unit cell 5, the conductive trances 11 correspond respectively to the first inductors 61 each having an inductance ($L_1$) in this embodiment. A mutual inductance ($L_m$) is formed between the mutually coupled conductive traces 11. The mutual capacitor 62 is formed between the conductive trances 11, and has a capacitance ($C_m$). The first substrate 31 of the dielectric unit 3 corresponds to the first capacitors 63 each of which has a capacitance ($C_1$) formed between the pattern 411 and a corresponding conductive trace 11. The second substrate 32 of the dielectric unit 3 corresponds to the second capacitor 64 that has a capacitance ($C_2$) formed between the pattern 411 and the grounding layer 2. The via unit, i.e., the via 42, corresponds to the second inductor 65 that has an inductance ($L_2$).

Figure 4:
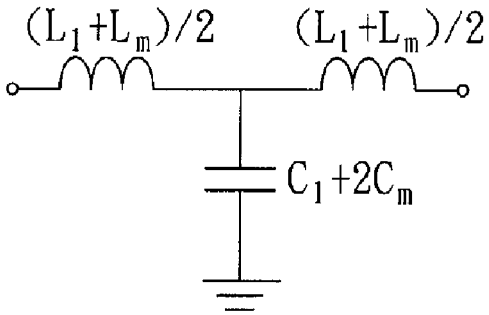
FIG. 4 is an equivalent circuit illustrating the unit cell of the first preferred embodiment in odd-mode analysis.
Figure 5:
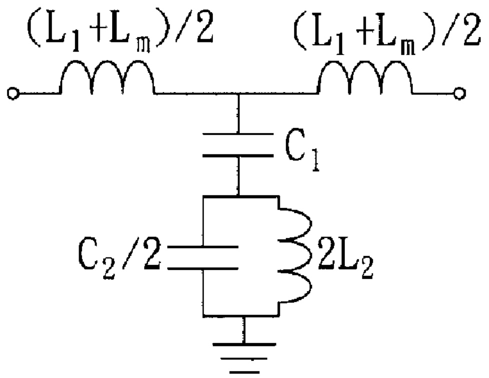
FIG. 5 is an equivalent circuit illustrating the unit cell of the first preferred embodiment in even-mode analysis.

Due to odd and even symmetries, the differential signal transmission circuit of FIG. 3 can further be represented as two equivalent circuits shown in FIGS. 4 and 5. By odd-mode analyzing the equivalent circuit of FIG. 4, a cutoff frequency ($f_c$) of the differential signal transmitted by the filtering device is represented as follows:

$$f_c = \frac{1}{\pi\sqrt{(L_1 - L_m)(C_1 + 2C_m)}}.$$

By even-mode analyzing the equivalent circuit of FIG. 5, a lower-side cutoff frequency ($f_L$) and an upper-side cutoff frequency ($f_H$) having a bandgap therebetween are represented as follows:

$$f_L = \frac{1}{2\pi}\sqrt{\frac{(\tilde{L}_1 C_1 + 4K) - \sqrt{(\tilde{L}_1 C_1 + 4K)^2 - 16(\tilde{L}_1 L_2 C_1 C_2)}}{2L_1 L_2 C_1 C_2}},$$

$$K = 2L_2C_1 + L_2C_2 \text{ and } \tilde{L}_1 = L_1 + L_m,$$

$$f_H = \frac{1}{2\pi\sqrt{L_2C_2}}.$$

As discussed above, each unit cell 5 thus configured exhibits an effective negative permittivity (i.e., the unit cell 5 is a metamaterial) and a positive permeability in the bandgap, which indicates an evanescent mode that exists in the transmission line 1 when the unit cell 5 is operated at a frequency ranging from the lower-side cutoff frequency ($f_L$) to the upper-side cutoff frequency ($f_H$), thereby suppressing the common-mode noises coupled to the conductive traces 11 in the bandgap.

When the size of the filtering device is reduced for miniaturization purposes by reduction of the period (p) of the patterns 411 (see FIG. 1), the capacitance ($C_1$) formed between each pattern 411 and anyone of the conductive traces 11, and the capacitance ($C_2$) formed between each pattern 411 and the grounding layer 2 are decreased correspondingly, thereby resulting in an increase in the lower-side and upper-side cutoff frequencies ($f_L$, $f_H$). Hence, when the size of the filtering device is to be reduced while maintaining the lower-side and upper-side cutoff frequencies ($f_L$, $f_H$) at desired operating levels, a meandering structure for the conductive traces 11, and a meandering structure for the via unit, as shown in FIGS. 6 and 7, can be used to increase the capacitance ($C_1$) formed between each pattern 411 and any one of the conductive traces 11, and the inductance ($L_2$) of each via unit, respectively.

Figure 6:
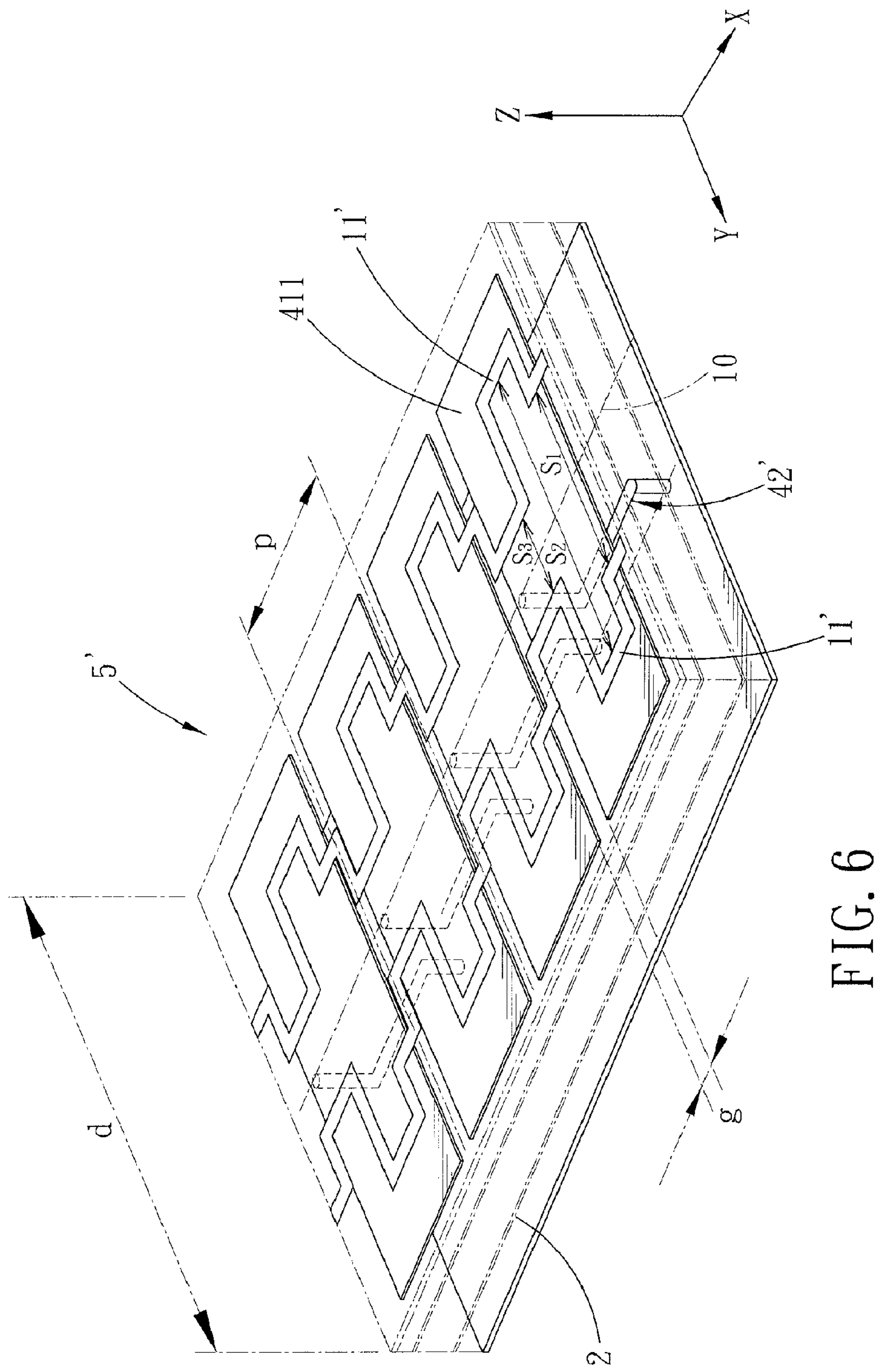
FIG. 6 is an assembled perspective view of the second preferred embodiment of a filtering device according to this invention.
Figure 7:
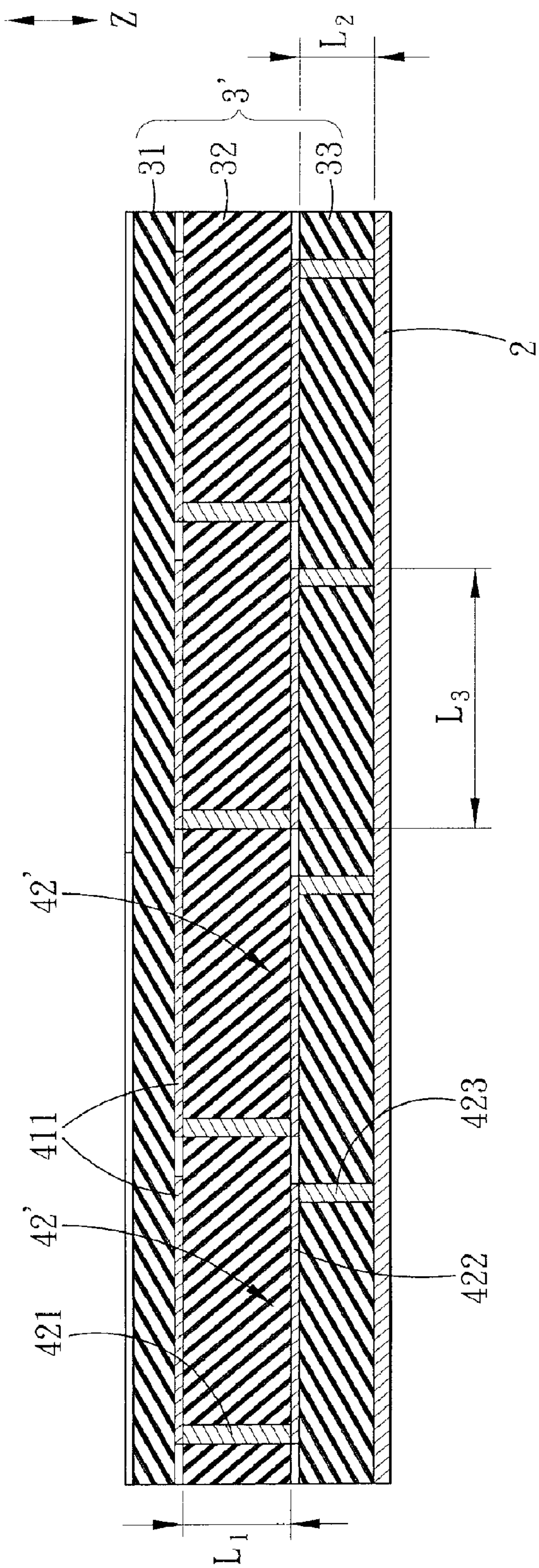
FIG. 7 is a schematic sectional view of the second preferred embodiment.

FIGS. 6 and 7 illustrate the second preferred embodiment of a filtering device capable of suppressing common-mode noises upon transmission of a differential signal according to this invention, which is a modification of the first preferred embodiment. In this embodiment, the filtering device can be implemented in a four-layer PCB.

In this embodiment, the conductive traces 11' are meandering so as to increase the capacitance ($C_1$) formed between each pattern 411 and any one of the conductive traces 11' and to decrease the lower-side cutoff frequency ($f_L$).

In this embodiment, the dielectric unit 3' further includes a third substrate 33 stacked with the first and second substrates 31, 32 in the third direction (Z) such that the second substrate 32 is disposed between the first and third substrates 31, 33.

In this embodiment, each via unit 42' includes a first via 421 formed in the second substrate 32, a second via 423 formed in the third substrate 33, and a conductive line 422 sandwiched between the second and third substrates 32, 33. For each via unit 42', the first via 422 extends in the third direction (Z), and contacts electrically the corresponding pattern 411. The second via 423 extends in the third direction (Z), is misaligned and spaced apart from the first via 422, and contacts electrically the grounding layer 2. The conductive line 422 is straight and interconnects electrically the first and second vias 421, 423. As a result, the inductance ($L_2$) of each via unit 42' is increased, and the lower-side and upper-side cutoff frequencies ($f_L$, $f_H$) are reduced.

Figure 8:
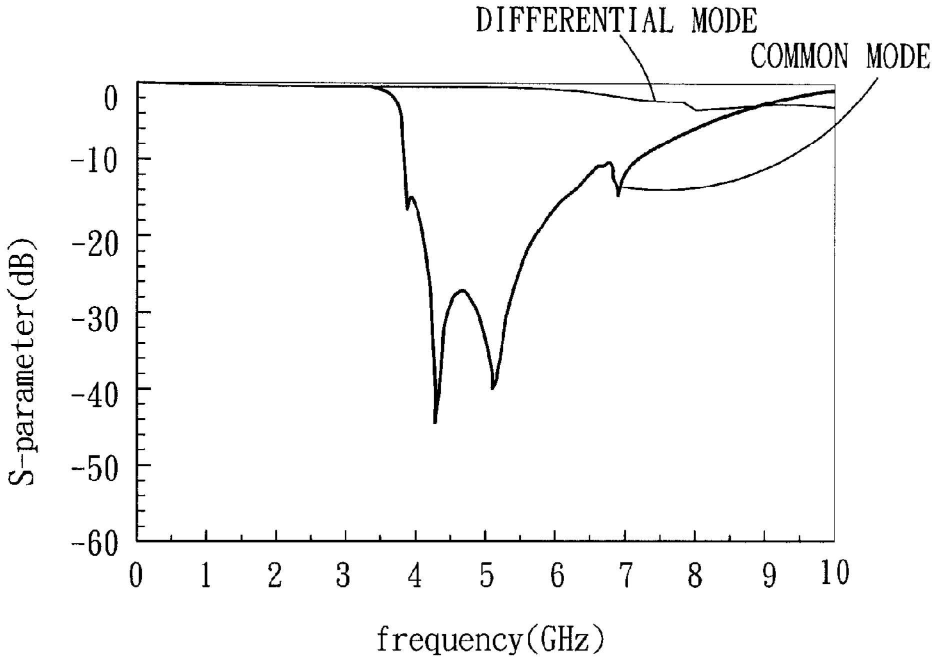
FIG. 8 is a plot illustrating measurement results of S-parameter of the second preferred embodiment with four unit cells in differential mode and common mode.
Figure 9:
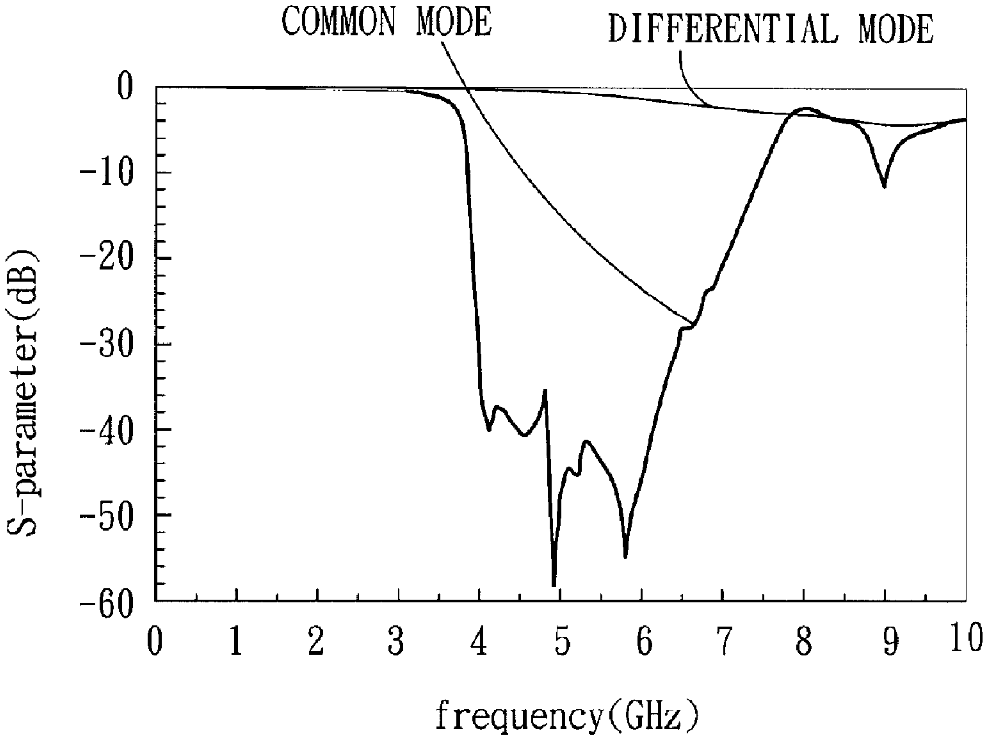
FIG. 9 is a plot illustrating measurement results of S-parameter of the second preferred embodiment with eight unit cells in differential mode and common mode.

FIG. 8 illustrates the measurement results S-parameter and frequency for the filtering device of FIG. 6 that has four unit cells 5'. FIG. 9 illustrates the S-parameter and frequency for the filtering device that has eight unit cells 5'. For example, the configuration of the filtering device is as follows. The width of each of the conductive traces 11' is 0.1 mm. Three distances ($s_1$, $s_2$, $s_3$) between the conductive traces 11' are 1.38 mm, 2.18 mm, 0.58 mm, respectively. The dielectric constant of the dielectric unit 3' is 7.8. The length (d) of each pattern 411 is 3.2 mm. The period (p) of the patterns 411 is 1.28 mm. The gap (g) between two adjacent ones of the patterns 411 is 0.18 mm. The diameter and length ($L_1$) of each first via 421 are 75 μm and 0.468 mm, respectively. The diameter and length ($L_2$) of each second via 423 are 75 μm and 0.312 mm, respectively. The width and length ($L_3$) of each conductive line 422 are 0.1 mm and 1 mm, respectively. The filtering device of FIG. 6 has a bandgap ranging from 3.8 GHz to 7.1 GHz, whereas the filtering device with eight unit cells has a bandgap ranging from 3.8 GHz to 7.4 GHz, which is wider than that of the filtering device of FIG. 6. The filtering device of FIG. 6 has a common-mode insertion loss, i.e., S-parameter, of about −10 dB on average, whereas the filtering device with eight unit cells has a common-mode insertion loss of about −20 dB on average. Hence, the greater the number of the unit cells 5' of the filtering device, the better will be common-mode noise suppression capability of the same.

Figure 10:
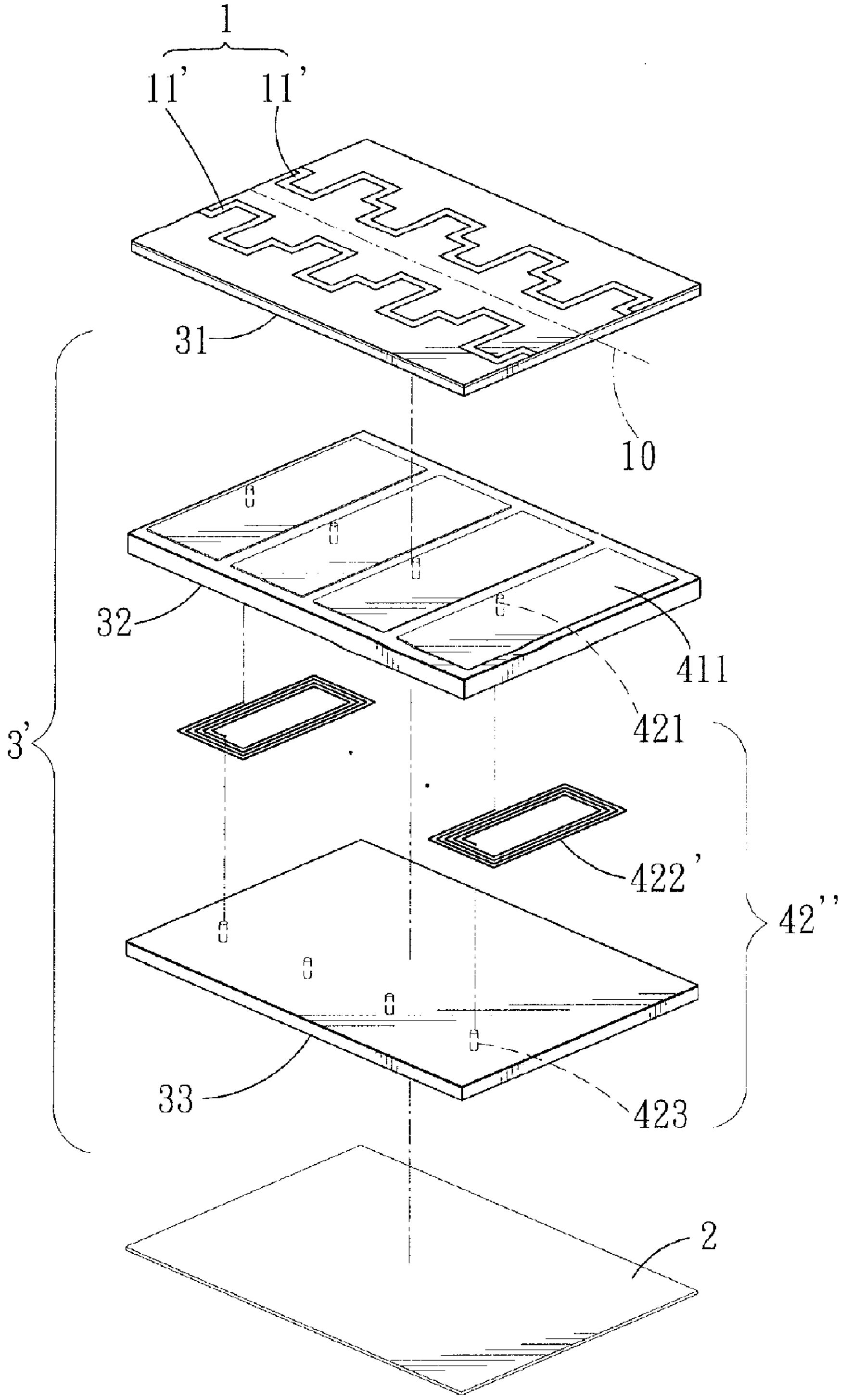
FIG. 10 is an exploded perspective view of the third preferred embodiment of a filtering device according to this invention.

FIG. 10 illustrates the third preferred embodiment of a filtering device capable of suppressing common-mode noises upon transmission of a differential signal according to this invention, which is a modification of the second preferred embodiment. In this embodiment, the conductive line 422' of each via unit 42" is generally spiral in shape such that the inductance ($L_2$) of each via unit 42" is further increased.

Figure 11:
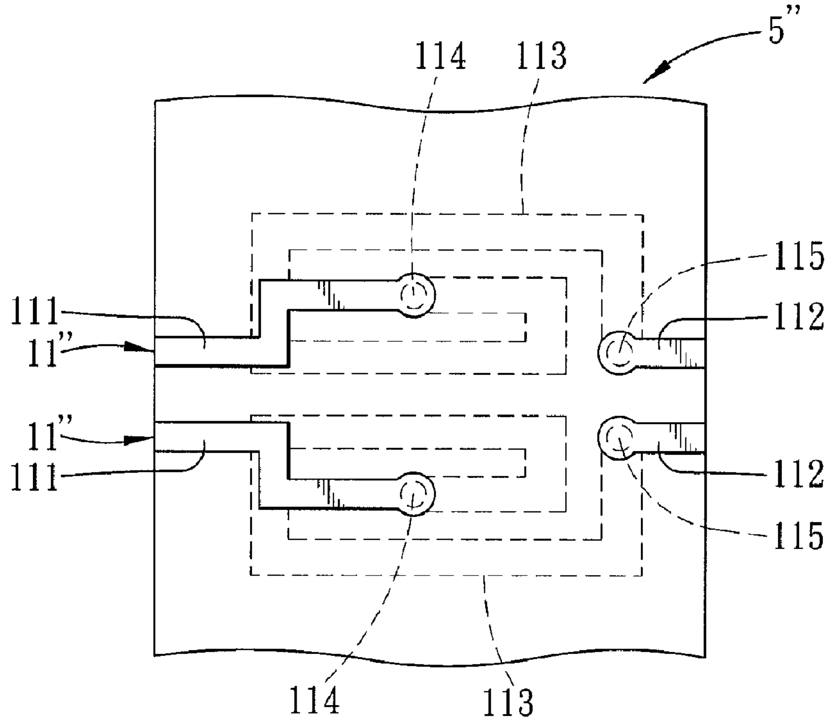
FIG. 11 is a schematic top view of the fourth preferred embodiment of a filtering device according to this invention.
Figure 12:
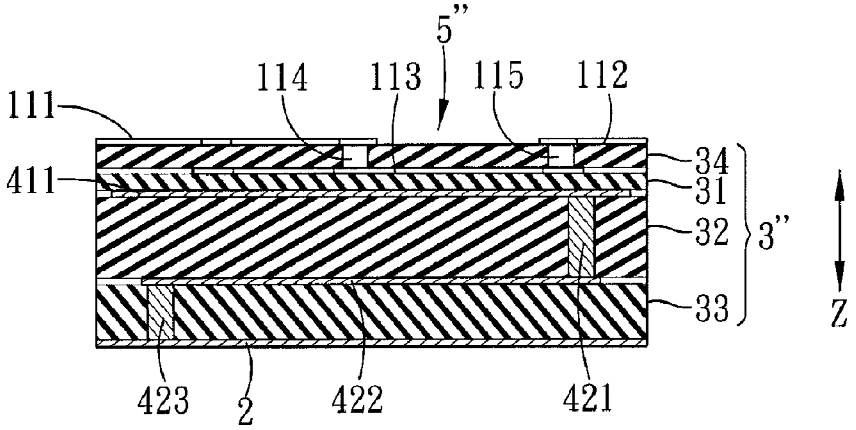
FIG. 12 is a schematic sectional view of the fourth preferred embodiment.

FIGS. 11 and 12 illustrate the fourth preferred embodiment of a filtering device capable of suppressing common-mode noises upon transmission of a differential signal according to this invention. The fourth preferred embodiment is a modification of the second preferred embodiment. In this embodiment, the filtering device can be implemented in a five-layer PCB, and has only one unit cell 5".

In this embodiment, the dielectric unit 3" further includes a fourth substrate 34 stacked on the first substrate 31.

In this embodiment, each of the conductive traces 11" has first and second segments 111, 112 overlaid on the dielectric unit 3", and a third segment 113 and first and second vias 114, 115 embedded in the dielectric unit 3". For each conductive trace 11", the first and second segments 111, 112 are coplanar and are overlaid on the fourth substrate 34. The third segment 113 is spaced apart from the first and second segments 111, 112 in the third direction (Z), is sandwiched between the first and fourth substrates 31, 34, and is generally spiral in shape. The first via 114 is formed in the fourth substrate 34, extends in the third direction (Z), and interconnects electrically the first and third segments 111, 113. The second via 115 is formed in the fourth substrate 34, extends in the third direction (Z), and interconnects electrically the second and third segments 112, 113. As a result, the capacitance ($C_1$) formed between the pattern 411 and any one of the conductive traces 11" is increased, which results in a decrease in the lower-side cutoff frequency ($f_L$) correspondingly, and the inductance ($L_1$) of each conductive trace 11" is increased so that the differential signal transmitted by the filtering device can substantially remain intact.

In sum, due to the presence of the conductive structure 4, the filtering device of the present invention can eliminate the aforesaid drawbacks associated with the prior art. In addition, due to the presence of the conductive traces 11', 11" having meandering and spiral structures, and the via units 42, 42', the filtering device of this invention can be miniaturized while maintaining the desired bandgap.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A filtering device capable of suppressing common-mode noises upon transmission of a differential signal, comprising:

a differential transmission line having a pair of conductive traces spaced apart from each other;

a grounding layer spaced apart from said differential transmission line;

a dielectric unit disposed between said differential transmission line and said grounding layer; and a conductive structure embedded in said dielectric unit, coupled electrically to said conductive traces and said grounding layer, and cooperating with said differential transmission line, said grounding layer and said dielectric unit to form a stacked structure that has an effective negative permittivity, thereby suppressing the common-mode noises coupled to said conductive traces.

2. The filtering device of claim 1, wherein said conductive structure includes:

a conductive layer formed with a plurality of patterns spaced apart from each other, each of said patterns being coupled electrically to said conductive traces; and a plurality of via units each interconnecting electrically a corresponding one of said patterns and said grounding layer.

3. The filtering device of claim 2, wherein said conductive traces of said differential transmission line are symmetrical with respect to a centerline defined therebetween and extending in a first direction.

4. The filtering device of claim 3, wherein said via units are aligned with the centerline.

5. The filtering device of claim 3, wherein said patterns of said conductive layer of said conductive structure are coplanar and are periodically arranged along the first direction, each of said patterns of said conductive layer of said conductive structure extending in a second direction transverse to the first direction, crossing said conductive traces along the second direction, and having two halves that are symmetrical with respect to the centerline.

6. The filtering device of claim 5, wherein said conductive traces of said differential transmission line extend in the first direction.

7. The filtering device of claim 6, wherein:

said dielectric unit includes first and second substrates stacked in a third direction transverse to the first and second directions;

said conductive layer is sandwiched between said first and second substrates; and each of said via units includes a via formed in said second substrate and extending in the third direction such that opposite ends of said via contact electrically and respectively the corresponding one of said patterns and said grounding layer.

8. The filtering device of claim 5, wherein said conductive traces of said differential transmission line are meandering.

9. The filtering device of claim 8, wherein each of said via units includes:

a first via extending in a third direction transverse to the first and second directions and contacting electrically the corresponding one of said patterns of said conductive layer;

a second via extending in the third direction, misaligned and spaced apart from said first via, and contacting electrically said grounding layer; and a conductive line interconnecting electrically said first and second vias.

10. The filtering device of claim 9, wherein:

said dielectric unit includes first, second and third substrates stacked in the third direction, said second substrate being disposed between said first and third substrates;

said conductive layer is sandwiched between said first and second substrates; and said first vias of said via units are formed in said second substrate, said second vias of said via units being formed in said third substrate, said conductive lines of said via units being sandwiched between said second and third substrates.

11. The filtering device of claim 9, wherein said conductive line of each of said via units is straight.

12. The filtering device of claim 9, wherein said conductive line of each of said via units is generally spiral in shape.

13. The filtering device of claim 1, wherein said conductive structure includes:

a conductive layer formed with a pattern which is coupled electrically to said conductive traces; and a via unit interconnecting electrically said pattern and said grounding layer.

14. The filtering device of claim 13, wherein said conductive traces of said differential transmission line are symmetrical with respect to a centerline defined therebetween and extending in a first direction.

15. The filtering device of claim 14, wherein said pattern of said conductive layer of said conductive structure extends in a second direction transverse to the first direction, crosses said conductive traces along the second direction, and has two halves that are symmetrical with respect to the centerline.

16. The filtering device of claim 15, wherein each of said conductive traces of said differential transmission line includes:

a first segment;

a second segment coplanar with said first segment;

a third segment spaced apart from said first and second segments in a third direction transverse to the first and second directions;

a first via extending in the third direction and interconnecting electrically said first and third segments; and a second via extending in the third direction and interconnecting electrically said second and third segments.

17. The filtering device of claim 16, wherein said first and second segments are overlaid on said dielectric unit, and said third segment is embedded in said dielectric unit.

18. The filtering device of claim 16, wherein said third segment of each of said conductive traces of said differential transmission line is generally spiral in shape.

19. A differential signal transmission circuit capable of suppressing common-mode noises upon transmission of a differential signal, comprising:

an input terminal;

an output terminal;

a pair of mutually coupled first inductors, each of which has opposite first and second ends, and a node disposed between said first and second ends, said first ends of said first inductors serving as said input terminal, said second ends of said first inductors serving as said output terminal;

a mutual capacitor coupled between said nodes of said first inductors;

a series connection of two first capacitors coupled between said nodes of said first inductors; and a parallel connection of a second capacitor and a second inductor coupled between a common node between said second capacitors, and a reference node.

* * * * *